(12) United States Patent
Wallack et al.

(10) Patent No.: US 8,872,911 B1
(45) Date of Patent: Oct. 28, 2014

(54) LINE SCAN CALIBRATION METHOD AND APPARATUS

(75) Inventors: Aaron S. Wallack, Natick, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 892 days.

(21) Appl. No.: 12/652,353

(22) Filed: Jan. 5, 2010

(51) Int. Cl.
*H04N 9/10* (2006.01)
*H04N 7/18* (2006.01)

(52) U.S. Cl.
CPC .................................. *H04N 7/183* (2013.01)
USPC .......................................................... 348/92

(58) Field of Classification Search
None
See application file for complete search history.

(56) References Cited

U.S. PATENT DOCUMENTS

| | | | |
|---|---|---|---|
| 5,745,242 A * | 4/1998 | Hata | 356/401 |
| 6,798,925 B1 * | 9/2004 | Wagman | 382/287 |
| 7,095,876 B2 * | 8/2006 | Broekaert | 382/107 |
| 2004/0170312 A1 * | 9/2004 | Soenksen | 382/133 |
| 2005/0025386 A1 * | 2/2005 | Ritt et al. | 382/284 |
| 2006/0165237 A1 * | 7/2006 | Villemoes et al. | 381/20 |
| 2007/0018101 A1 * | 1/2007 | Nakasuji et al. | 250/310 |
| 2007/0229665 A1 * | 10/2007 | Tobiason et al. | 348/187 |
| 2007/0279607 A1 * | 12/2007 | Smith et al. | 355/52 |
| 2008/0001066 A1 * | 1/2008 | Ax et al. | 250/208.1 |
| 2009/0028243 A1 * | 1/2009 | Suzuki et al. | 375/240.15 |
| 2009/0135418 A1 * | 5/2009 | Wolff | 356/318 |
| 2009/0185715 A1 * | 7/2009 | Hofhauser et al. | 382/103 |
| 2009/0195775 A1 * | 8/2009 | Nakao et al. | 356/237.2 |
| 2009/0212213 A1 * | 8/2009 | Nakasuji et al. | 250/310 |
| 2010/0091334 A1 * | 4/2010 | Qiao et al. | 358/3.26 |

* cited by examiner

*Primary Examiner* — Sath V Perungavoor
*Assistant Examiner* — Kate Luo
(74) *Attorney, Agent, or Firm* — Quarles & Brady LLP

(57) ABSTRACT

A method and apparatus for assessing at least one of motion linearity of a motion stage, stage motion straightness of a motion stage, image capture repeatability of a motion stage and camera and accuracy of a calibration plate used to assess motion stage characteristics, the method including using a line scan camera to generate two dimensional images of a calibration plate having a plurality imageable features thereon, examining the images to identify actual coordinates of the imageable features and using the actual coordinates to assess linearity, straightness, repeatability and/or plate accuracy.

27 Claims, 8 Drawing Sheets

LINE SCAN CALIBRATION METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention includes a method and apparatus for detecting non-linearity in a motion stage and/or imperfections in a calibration plate used to detect non-linearity.

Cameras are used in many different manufacturing industries to determine locations and orientations of components being manufactured, to identifying component characteristics, obtaining information (e.g., via a bar or matrix code) from a component surface, etc. Many cameras used in manufacturing processes today include an image sensor such as a complementary metal-oxide-semiconductor (CMOS) device or a charge coupled device (CCD) that is constructed of an array of photosensitive elements that each sense light and generate an associated pixel of information where the array of pixel information together forms an image.

Cameras may be grouped into two general categories including 2D cameras and line scan cameras. As the label implies, a 2D camera typically includes a two dimensional array of photosensitive elements and generates a 2D image of a camera field of view (FOV). A line scan camera typically includes a one dimensional line of photosensitive elements and generates a line scan of a one dimensional FOV. A line scan camera can be used to generate a 2D image of a component by obtaining a plurality of line scan images using the line scan camera as the component is moved through the camera's FOV. After a plurality of line scan images of the component in different positions are obtained, a processor can combine the line scan images to generate a 2D image.

While 2D cameras are useful in many applications, line scan cameras have several advantages. First, where an application requires images of at least a specific resolution, line scan cameras typically can provide images at the required resolution less expensively than 2D cameras. For instance, where resolution of 500 by 500 pixels is required, a 2D camera would have to include 250,000 photosensitive elements compared to a 500 photosensitive element line scan camera. Second, some applications require wide area imaging that 2D cameras cannot practically facilitate given resolution requirements and space constraints. In contrast, line scan cameras may be manufactured that have extended width dimensions (e.g., 8K photosensitive elements) to facilitate high resolution wide area imaging in small spaces. Third, given comparable numbers of photosensitive elements, a line scan camera that includes all photosensitive elements arranged in a single row can be used to obtain images having a much greater resolution (e.g., 8K by 8K). Fourth, line scan cameras often require much less space than a 2D camera and therefore are better suited to certain applications.

When using a line scan camera to obtain data to generate a 2D image of a component, in order to obtain an accurate image (e.g. an image with enough spatial accuracy and repeatability to allow very accurate alignment, gauging, and inspection operations to be performed on the images), the component being imaged must be moved linearly along a trajectory perpendicular to and through the line scan camera's FOV. More specifically, where the trajectory perpendicular to the camera's FOV is along a Y-axis, in order to generate an accurate 2D image, the component has to be moved straight along the Y-axis without twisting. In addition, the line scan images have to be obtained at identical spatial intervals along the Y-axis to yield an accurate 2D image.

The most common solution for moving a component linearly with respect to a line scan camera FOV has been to use a linear motion stage. A linear motion stage, as the label implies, is a tool configuration used to restrict an object to a single axis of motion. Typically, a linear motion stage consists of a platform and a base joined by some form of guide or linear bearing in such a way that the platform is restricted, in theory, to linear motion along a straight trajectory with no twisting. An encoder may be provided with a motion stage which generates signals indicative of distance moved by the platform (and a component supported thereby) and the encoder signal may be used by a line scan camera controller to control when line scan images are obtained. The idea here is that the camera controller controls the camera to obtain images at equal spatial intervals as the platform/component is moved with respect to the camera.

Unfortunately, despite best design and manufacturing efforts, many linear motion stages are not linear after installation. For instance, in some cases a stage may include a slight bend and therefore be non-straight. In other cases a stage may be slightly twisted. In yet other cases the encoder signal may not accurately reflect the travel distance of the platform/component along the stage trajectory so that images obtained by the line scan camera are not at equal spatial intervals. In still other cases, any combination of twisted motion, non-straight motion and inaccurate encoder signal problems may occur which results in obtaining inaccurate images.

Currently, when a motion stage and line scan camera are configured together, if the motion stage is nonlinear with respect to the camera there is no easy way to identify the nonlinearity, the source of the nonlinearity or the degree of nonlinearity. For this reason, it would be advantageous to have a system and a process for detecting a nonlinear motion stage, detect the degree of nonlinearity and to determine the source of nonlinearity.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BACKGROUND OF THE INVENTION

After mechanically configuring a line scan image acquisition system including a line scan camera and a motion stage, there is no guarantee that the motion stage will behave in a linear fashion. It has been recognized that the system itself can be used to generate images that are in turn usable to assess various system characteristics to determine system accuracy/precision. The accuracy/precision of the characteristics can then be used, in at least some embodiments, to identify the source of any perceived problems and to compensate for or eliminate the inaccuracy/imprecision. More specifically, at least some embodiments in this disclosure include one or more of a stage motion linearity experiment, a stage motion straightness experiment, an image feature repeatability experiment and a calibration plate accuracy experiment.

Consistent with the comments above, at least some embodiments of this disclosure include a method for assessing motion linearity of a motion stage, the method for use with a line scan camera having a field of view (FOV), where the motion stage includes a moveable platform positioned with respect to the camera so that the platform travels through the camera FOV along a motion stage trajectory, the method comprising the steps of providing a calibration plate that includes at least four imageable features, using the line scan camera to obtain data for generating a first two dimensional image of the calibration plate as the motion stage moves the calibration plate through the camera field of view along the motion stage trajectory, running a processor programmed to perform the steps of examining the obtained image to identify actual Y coordinates of the features in the image and processing the actual Y coordinates to assess stage motion linearity.

In at least some cases the calibration plate includes at least four imageable features arranged in four separate rows equi-spaced along the Y-axis of the plate. In at least some cases an X-axis of the plate is perpendicular to the Y-axis of the plate and wherein the four imageable features are arranged in a single column and have the same X-axis coordinate. In at least some cases the step of processing the actual Y coordinates includes using the actual Y coordinates for the features to solve N linear equations for M unknown coefficients where M is less than N, using the M coefficients to solve at least one of the N linear equations to identify a predicted Y coordinate for one of the imageable features, comparing the predicted Y coordinate for the one of the imageable features and the actual Y coordinate of the one of the features to generate at least one residual value and using the at least one residual value to assess motion linearity.

In at least some cases the step of using the actual Y coordinates to solve N equations for M coefficients includes performing a least squares process on the N equations to generate the M coefficients. In at least some cases the step of using the M coefficients to solve at least one of the N equations includes using the M coefficients to solve at least a subset of more than two of the linear equations to identify a separate predicted Y coordinate for each of a subset of the imageable features, the step of comparing including comparing the predicted and actual Y coordinates of a subset of the imageable features to generate a plurality of residual values and the step of using the residual value including the step of using a subset of the plurality of residual values to assess motion linearity. In at least some cases the calibration plate includes four equi-spaced rows and four equi-spaced columns of imageable features.

In some cases the method is also for assessing stage motion straightness, wherein the step of providing a calibration plate includes providing a plate that includes a plurality of imageable features arranged in at least two equi-spaced rows and two equi-spaced columns, the processor further programmed to perform the steps of examining the obtained image to identify actual X coordinates of the imageable features in the image and processing the actual X coordinates to assess stage motion straightness.

In at least some cases the calibration plate includes at least thirteen imageable features. In at least some cases the step of processing the actual X coordinates includes using the actual X coordinates for the imageable features to solve at least thirteen equations for twelve coefficients, using the twelve coefficients to solve at least one of the thirteen equations to calculate a predicted X coordinate for at least one of the imageable features, comparing the predicted X coordinate for the one of the imageable features and the actual X coordinate of the one of the imageable features to generate at least one residual value and using the at least one residual value to assess stage motion straightness.

In at least some cases wherein the calibration plate includes four equi-spaced rows and four equi-spaced columns of imageable features and wherein the step of processing the actual X coordinates includes using the actual X coordinates for the features to solve sixteen fifth order equations to calculate twelve coefficients, using the twelve coefficients to solve at least one of the sixteen fifth order equations to calculate a predicted X coordinate for at least one of the imageable features, comparing the predicted X coordinate for the at least one of the fifth order equations and the actual X coordinate for the one of the imageable features to generate at least one residual value and using the at least one residual value to assess stage motion straightness.

In some cases the method is also for assessing image capture repeatability wherein the actual X and Y coordinates of the imageable features in the first image are first image coordinates, the method further comprising the steps of where the first image was generated with the calibration plate in a first position with respect to the platform, removing the calibration plate from the platform, attempting to replace the calibration plate on the platform in the first position, using the line scan camera to obtain data for generating a second two dimensional image of the calibration plate as the motion stage moves the calibration plate through the camera field of view along the motion stage trajectory, the processor further programmed to perform the steps of examining the obtained image to identify second image coordinates including actual X and Y coordinates of the imageable features in the second image and processing the first and second image coordinates to assess image capture repeatability.

In at least some cases the step of processing the first and second image coordinates includes identifying a best fit affine transformation that best relates the first image coordinates and the second image coordinates and identifying a residual associated with the best fit affine transformation.

In some cases the method further includes the steps of, removing the plate from the platform and replacing the plate on the platform in a second position, using the line scan camera to obtain data for generating a third two dimensional image of the calibration plate as the motion stage moves the calibration plate through the camera field of view along the motion stage trajectory, running the processor to perform the steps of examining the obtained third image to identify third image coordinates including actual X and Y coordinates of the imageable features in the third image, removing the plate from the platform and attempting to replace the plate on the platform in the second position, using the line scan camera to obtain data for generating a fourth two dimensional image of the calibration plate as the motion stage moves the calibration plate through the camera field of view along the motion stage trajectory and running the processor to perform the steps of examining the obtained fourth image to identify fourth image coordinates including actual X and Y coordinates of the imageable features in the fourth image, the step of processing coordinates to assess image feature repeatability including processing the first, second, third and fourth image coordinates to assess image feature repeatability.

In some cases the method is also for assessing calibration plate accuracy wherein the calibration plate has been designed so that the positions of at least a subset of the imageable features on the plate should form the same pattern in obtained images irrespective of whether or not the calibration plate is in the first or a second position on the platform, the method further comprising the steps of, removing the calibration plate from the platform and replacing the calibration plate on the platform in the second position, using the line scan camera to obtain data for generating a third two dimensional image of the calibration plate as the motion stage moves the calibration plate through the camera field of view along the motion stage trajectory, the processor further programmed to perform the steps of examining the third image to identify third image coordinates including actual X and Y coordinates of the imageable features in the third image and processing the first and third image coordinates to assess calibration plate accuracy.

In at least some cases the step of processing the first and third image coordinates includes identifying a best fit affine transformation that best relates the first image coordinates and the third image coordinates and identifying a residual associated with the best fit affine transformation.

Other embodiments include a method for assessing stage motion straightness of a motion stage, the method for use with a line scan camera having a field of view (FOV), where the motion stage includes a moveable platform positioned with respect to the camera so that the platform travels through the camera FOV along a motion stage trajectory, the method comprising the steps of providing a calibration plate that includes a plurality of imageable features arranged in at least two equi-spaced rows and two equi-spaced columns where the columns are aligned along a Y-axis of the plate, supporting the calibration plate on the platform so that the Y-axis of the plate is aligned parallel to the motion stage trajectory, using the line scan camera to obtain data for generating a first two dimensional image of the calibration plate as the motion stage moves the calibration plate through the camera field of view along the motion stage trajectory, running a processor programmed to perform the steps of examining the obtained image to identify actual X coordinates of the imageable features in the image and processing the actual X coordinates to assess stage motion straightness.

Still other embodiments include a method for assessing image capture repeatability of a motion stage and camera system, the method for use with a line scan camera having a field of view (FOV), where the motion stage includes a moveable platform positioned with respect to the camera so that the platform travels through the camera FOV along a motion stage trajectory, the method comprising the steps of providing a calibration plate that includes at least first and second imageable features, using the line scan camera to obtain data for generating a first two dimensional image of the calibration plate as the motion stage moves the calibration plate through the camera field of view along the motion stage trajectory, removing the calibration plate from the platform, attempting to replace the calibration plate on the platform in the first position, using the line scan camera to obtain data for generating a second two dimensional image of the calibration plate as the motion stage moves the calibration plate through the camera field of view along the motion stage trajectory, running a processor programmed to perform the steps of examining the first image to identify first image coordinates including actual X and Y coordinates of the imageable features in the first image, examining the second image to identify second image coordinates including actual X and Y coordinates of the imageable features in the second image and processing the first and second image coordinates to assess image capture repeatability.

In at least some cases the step of processing the first and second image coordinates includes identifying a best fit affine transformation that best relates the first image coordinates and the second image coordinates and identifying a residual associated with the best fit affine transformation.

Other embodiments include method for assessing calibration plate accuracy of a calibration plate for use in calibrating a motion stage, the method for use with a line scan camera having a field of view (FOV), where the motion stage includes a moveable platform positioned with respect to the camera so that the platform travels through the camera FOV along a motion stage trajectory, the method comprising the steps of providing a calibration plate that includes at least first and second imageable features wherein the plate includes a Y-axis and has been designed so that the positions of at least a subset of the imageable features on the plate should form the same pattern in obtained images irrespective of whether or not the calibration plate is in the first or a second position on the platform, supporting the calibration plate on the platform in the first position, using the line scan camera to obtain data for generating a first two dimensional image of the calibration plate as the motion stage moves the calibration plate through the camera field of view along the motion stage trajectory, removing the calibration plate from the platform, supporting the calibration plate on the platform in the second position, using the line scan camera to obtain data for generating a second two dimensional image of the calibration plate as the motion stage moves the calibration plate through the camera field of view along the motion stage trajectory, running a processor programmed to perform the steps of examining the first image to identify first image coordinates including actual X and Y coordinates of the imageable features in the first image, examining the second image to identify second image coordinates including actual X and Y coordinates of the imageable features in the second image and processing the first and second image coordinates to assess calibration plate accuracy.

In at least some cases the step of processing the first and second image coordinates includes identifying a best fit affine transformation that best relates the first image coordinates and the second image coordinates and identifying a residual associated with the best fit affine transformation.

Still other embodiments include a method for assessing at least two of motion linearity and stage motion straightness of a motion stage as well as image capture repeatability and calibration plate accuracy, the method for use with a line scan camera having a field of view (FOV), where the motion stage includes a moveable platform positioned with respect to the camera so that the platform travels through the camera FOV along a motion stage trajectory, the method comprising the steps of providing a calibration plate that includes a plurality of imageable features arranged in equi-spaced rows and equi-spaced columns where the columns, supporting the calibration plate on the platform in first through fourth positions wherein the Y-axis of the plate is substantially parallel to the motion stage trajectory when in the first position and is substantially parallel to the motion stage trajectory and rotated 180 degrees from the first position when in the third position and the X-axis of the plate is parallel to the motion stage trajectory when in the second position and is parallel to the motion stage trajectory and rotated 180 degrees from the second position when in the fourth position, for each of the first through fourth positions, the method further including the step of using the line scan camera to obtain data for generating two two-dimensional images of the calibration plate as the motion stage moves the calibration plate through the camera field of view along the motion stage trajectory, running a processor programmed to perform the steps of examining the obtained images to identify actual X and Y coordinates of the imageable features in the images and processing the actual X and Y coordinates to assess at least two of stage motion linearity, stage motion straightness, image capture repeatability and calibration plate accuracy.

Other embodiments include a method for assessing motion linearity of a motion stage, the method for use with a line scan camera having a field of view (FOV), where the motion stage includes a moveable platform positioned with respect to the camera so that the platform travels through the camera FOV along a motion stage trajectory, the method comprising the steps of providing a calibration plate that includes at least four imageable features, using the line scan camera to obtain data for generating a first two dimensional image of the calibration plate as the motion stage moves the calibration plate through the camera field of view along the motion stage trajectory, running a processor programmed to perform the steps of examining the obtained image to identify actual image coordinates of the features in the image and processing the actual image coordinates to assess one or more of the following: stage motion linearity, stage motion straightness, image feature registration repeatability, calibration plate accuracy.

Other embodiments include a method for configuring a very high accuracy/high precision vision system including a line scan camera having a field of view (FOV), line scan camera optics and a motion stage, where the motion stage includes a moveable platform positioned with respect to the camera so that the platform travels through the camera FOV along a motion stage trajectory, the method comprising the steps of attempting to build a very high accuracy/high precision vision system using the line scan camera, line scan camera optics and a motion stage, performing a calibration procedure including at least one of a stage motion linearity experiment, a stage motion straightness experiment, an image feature repeatability experiment and a calibration plate accuracy experiment to generate test results, using the test results to assess system accuracy/precision and where accuracy/precision of the system is below a threshold level, modifying the system to increase accuracy/precision and repeating the calibration procedure and the step of using the test results to assess system accuracy/precision.

In at least some cases the step of performing a calibration procedure also generates information indicating the source of inaccuracy/imprecision. In at least some cases the information indicating the source of inaccuracy/imprecision indicates at least one of the calibration plate, stage straightness and stage non-linearity. In at least some cases the step of performing a calibration procedure includes performing each of the stage motion linearity experiment, the stage motion straightness experiment, the image feature repeatability experiment and the calibration plate accuracy experiment to generate test results. In at least some cases the step of performing a calibration procedure includes performing each of the stage motion linearity experiment and the stage motion straightness experiment and only performing the image feature repeatability experiment and the calibration plate accuracy experiment when the stage motion linearity experiment and the stage motion straightness experiment inaccuracies are greater than threshold levels.

DETAILED DESCRIPTION OF THE INVENTION

Figure 1:
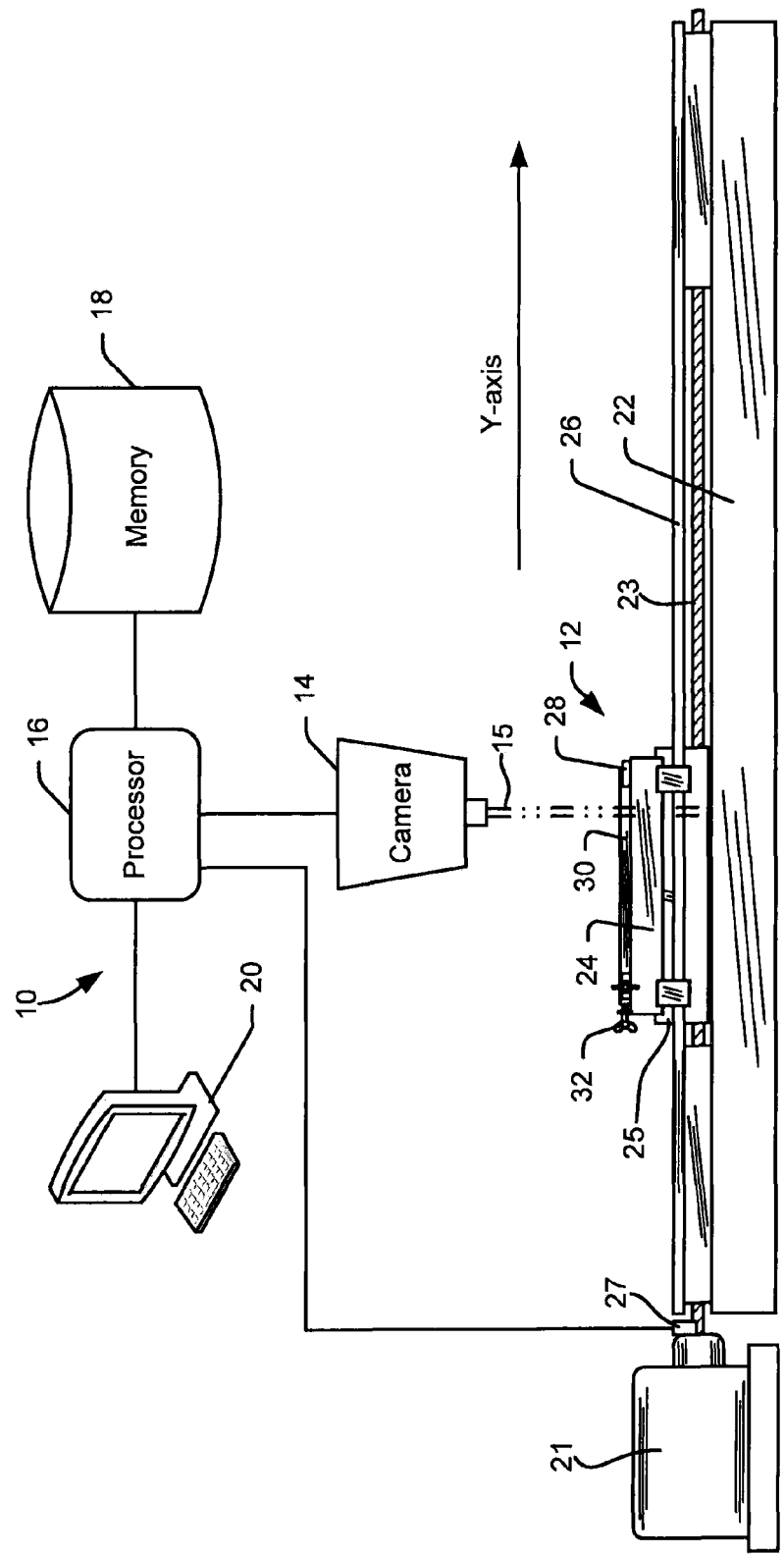
FIG. 1 is a schematic illustrating an exemplary system including a line scan camera and a linear motion stage that may be used to perform the methods described in this disclosure.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In at least one embodiment, after a motion stage and associated line camera are installed with the stage arranged so that the stage platform is to move perpendicularly through the field of view (FOV) of the camera, a calibration plate is mounted to the stage in a first orientation. Here, in at least some embodiments, the plate is precisely manufactured to include a plurality of imageable features (e.g., stars, circles, boxes/squares, etc.) that are precisely equi-spaced in rows and columns. In the first orientation, the plate is mounted such that the rows are essentially perpendicular to the trajectory of plate travel during motion stage operation. The stage and camera are operated to obtain a first image of the plate.

The plate is next rotated through 90 degrees and re-mounted to the platform with the rows essentially perpendicular to the trajectory of plate travel during motion stage operation and a second image is obtained with the plate in a second orientation. The plate is rotated two more times through 90 degrees and two additional images are generated with the plate in third and fourth orientations, respectively. Next, in at least some embodiments, the plate is repositioned again in the first, second, third and fourth orientations and fifth, sixth, seventh and eighth images are obtained.

After the first through eighth images are obtained, in at least some embodiments four experiments are performed using the images. The first experiment is performed to assess stage motion linearity (i.e. how constant stage motion is along the Y-axis (i.e., the trajectory perpendicular to the camera's field of view)) and the second experiment is performed to assess stage motion straightness. The third experiment is performed to provide a measure of image repeatability and the fourth experiment is performed to provide a measure of calibration plate accuracy. Together, the experiment results are usable to identify a nonlinear motion stage, detect the degree of nonlinearity and to determine the source of nonlinearity.

Camera/Linear Stage System

Referring now to the figures wherein like reference numerals correspond to similar elements throughout the several views and more specifically referring to FIG. 1, the present invention will be described in the context of an exemplary camera/motion stage assembly 10 that includes a motion stage assembly 12, a line scan camera 14, a processor 16, a memory 18 and an interface 20. Exemplary motion stage assembly 12 includes a base 22, a pair of rails 26 (see also FIG. 2) mounted to the base 22 and a platform 24 mounted to the rails 26 via a linear bearing or the like for movement along a Y-axis that is essentially parallel to the length of rails 26. The stage 12 also includes a motor 21 to drive a threaded shaft 23. Platform 24 is mounted to shaft 23 via a threaded carriage 25 such that when the shaft 23 is rotated, the platform 24 is driven along rails 26. An encoder 27 is mounted adjacent the shaft and generates signals indicating movement of the platform along the rails 26 and provides the signals to processor 16.

Figure 2:
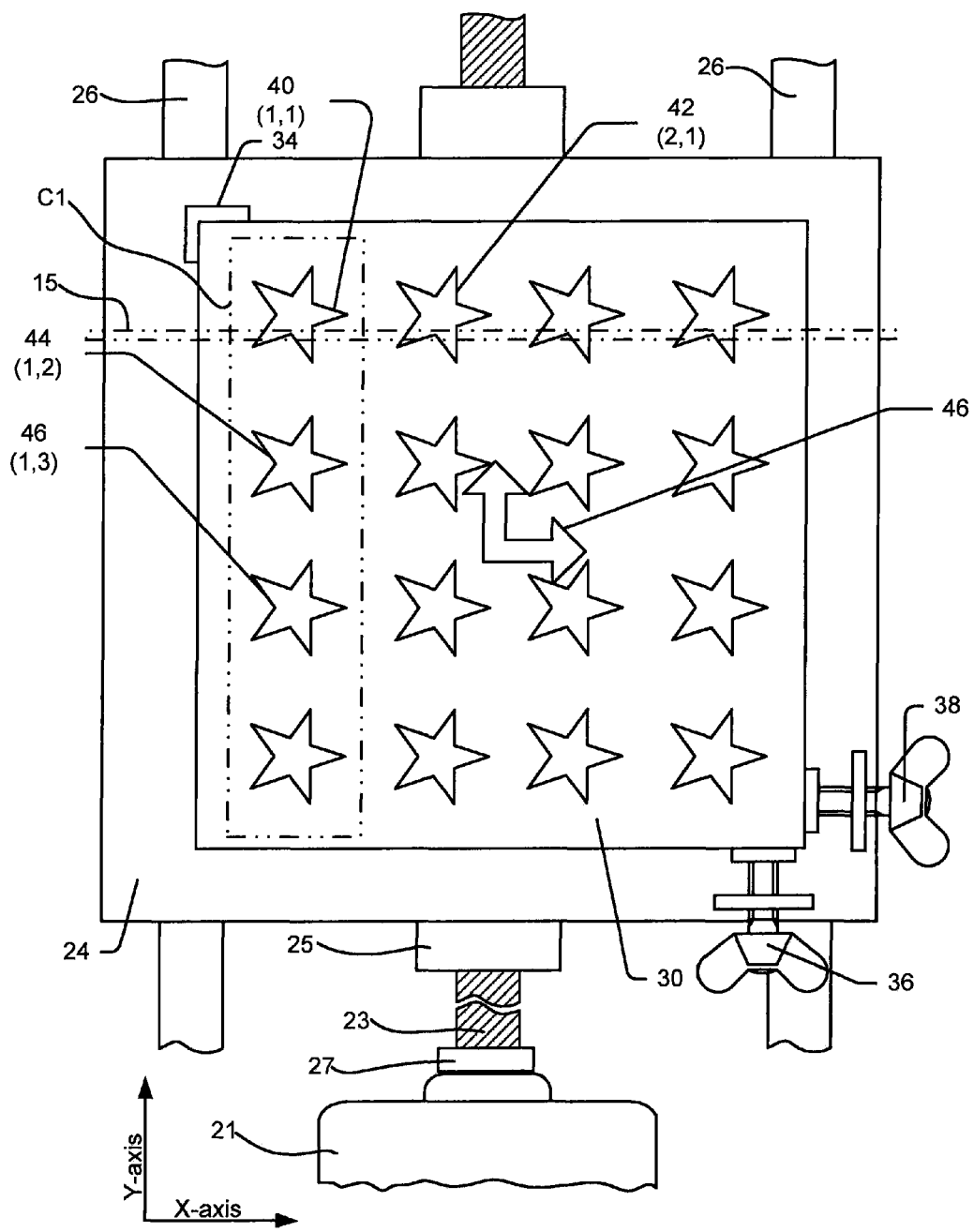
FIG. 2 is a top plan view of a subassembly of the motion stage shown in FIG. 1 with a calibration plate secured to a stage platform.

Referring to FIG. 2, in at least some embodiments, the platform 24 is fitted with mechanical components that can be used to secure a calibration plate 30 in a repeatable position to platform 24. In FIG. 2, the mechanical components include a single corner member 34 and first and second wing nut assemblies 36 and 38 where corner member 34 is designed to receive the edge of calibration plate 30 adjacent a first corner of the plate and wing nut assemblies 36 and 38 are positioned adjacent a plate edge adjacent a second corner opposite the first. The wing nut assemblies 36 and 38 can be tightened against the edge of plate 30 to secure the plate 30 to platform 24. Here, the corner member 34 and assemblies 36 and 38 are arranged with respect to the platform 24 such that, ideally, a feature pattern (see the stars in FIG. 2) on the plate 30 moves linearly and along a straight line as the motion stage is operated.

Referring again to FIG. 1, camera 14 is a line scan camera that includes a linear field of view 15 (see also FIG. 2). The camera 14 is arranged with respect to stage 12 such that the field of view (FOV) is, ideally, perpendicular to the trajectory of travel of platform 24 during stage operation. Thus, ideally, where platform 24 moves along the Y-axis during stage operation, the camera FOV is arranged along an X-axis as shown in FIG. 2.

Processor 16 runs programs to perform various processes including control of and collection of data from the camera 14, processing the camera data to generate two dimensional images, executing the four experiments described herein on the images and indicating the results of the four experiments. More specifically, processor 16 is linked to camera 14 to provide control signals thereto and also to receive image data useable to generate two dimensional images of the calibration plate 30 as the plate is moved along the Y-axis. Processor 16 is also linked to memory 18 and stores the two dimensional images in memory 18 so that, after images are obtained, the processor can reaccess the images and perform the four experiments described herein.

Interface 20 is a simple computer interface that includes a display screen and a keyboard and/or other input device and enables a system user to control the motion stage as well as the camera 14. In addition, interface 20 can be used to view data that results from the experiments.

Referring now to FIG. 2, exemplary calibration plate 30 includes a square flat plate that forms a known lattice pattern of imageable features on a top surface. More specifically, the pattern includes a set of sixteen stars arranged in four columns and four rows where the columns and rows are, ideally, precisely equi-spaced with respect to the edges of the plate 30 and with respect to each other. A first column is labeled C1 in FIG. 2 and a double-headed arrow 46 is provided on plate 30 (and also in the plate representations in FIG. 3) to help orient the reader. Thus, ideally, the stars are equi-spaced along the X-axis and Y-axis. Each of the stars can be referenced by its column and row. For instance, a star 40 in the first column and first row can be referenced as star (1,1), a star 42 in the second column and first row can be referenced as star (2,1), a star 44 in the first column, second row can be referenced as star (1,2), a star 46 in the first column, third row, can be referenced as star (1,3), etc.

After an image of plate 30 is obtained, each star in the image has an actual position. Hereinafter the center point of a star will be referred to as the star's actual position within an image. The actual positions of the stars can be referenced by X and Y coordinates as $(x(u,v), y(u,v))$ where the "u" and "v" indicate row and column number of a star, respectively. For instance, for star (1,1) in FIG. 2, where the x coordinate of the star is 5.0 and the y coordinate is 5.1, the position of the star can be represented as $(5.0(1,1), 5.1(1,1))$, where the x and y coordinates of star (1,2) are 5.0 and 10.0, respectively, the position of star (1,2) may be represented as $(5.0(1,2), 10.0(1,2))$, and so on.

During the process of obtaining images for the experiments, in at least some embodiments, after one image is obtained, the plate is removed from the platform and reoriented/resecured to the platform and another image is generated. Where different images are generated, each image has its own set of star positions. To distinguish star positions corresponding to one image from star positions corresponding to another image hereinafter, unless indicated otherwise, each position will include a subscript number that indicates which image the position corresponds to. For instance, where eight different images are obtained, for the first image, a star position will be represented as $(x1(u,v), y1(u,v))$, for the second image, a star position will be represented as $(x2(u,v), y2(u,v))$, for the eighth image, a star position will be represented as $(x8(u,v), y8(u,v))$, and so on. More specifically, for star (1,1) in the first image, the position will be represented as $(x1(1,1), y1(1,1))$ (see FIG. 3, first plate orientation), for star (2,2) in the fourth image, the position will be represented as $(x4(2,2), y4(2,2))$ (see FIG. 3, fourth plate orientation), for star (4,5) in the seventh image, the position will be represented as $(x7(4,5), y7(4,5))$ (see FIG. 3, seventh plate orientation), and so on.

Obtaining/Processing Images

In at least one embodiment, the system of FIGS. 1 and 2 is used to obtain eight separate two dimensional images of plate 30 where the plate 30 is removed from and re-secured to the platform 24 between images. More specifically, in a first plate orientation shown in the upper left hand corner of FIG. 3 and used to generate a first image, plate 30 is secured to platform 24 such that the first star column C1 is essentially parallel to the Y-axis of stage motion and is on the left hand side as illustrated. In a second orientation shown in the upper right hand corner of FIG. 3 and used to generate a second image, plate 30 is rotated counterclockwise by 90 degrees and is secured to platform 24 such that the first column C1 is essentially perpendicular to the Y-axis of stage motion and will pass through the camera FOV after the other star columns pass therethrough. In a third orientation used to generate a third image, plate 30 is again rotated 90 degrees counterclockwise and secured to platform 24 such that column C1 is again essentially parallel to the Y-axis of stage motion, but is on the right hand side as illustrated. In a fourth orientation used to generate a fourth image, plate 30 is again rotated counter-clockwise by 90 degrees and is secured to platform 24 such that first column C1 is essentially perpendicular to the Y-axis of stage motion and will pass through the camera FOV prior to the other star columns passing therethrough.

Figure 3:
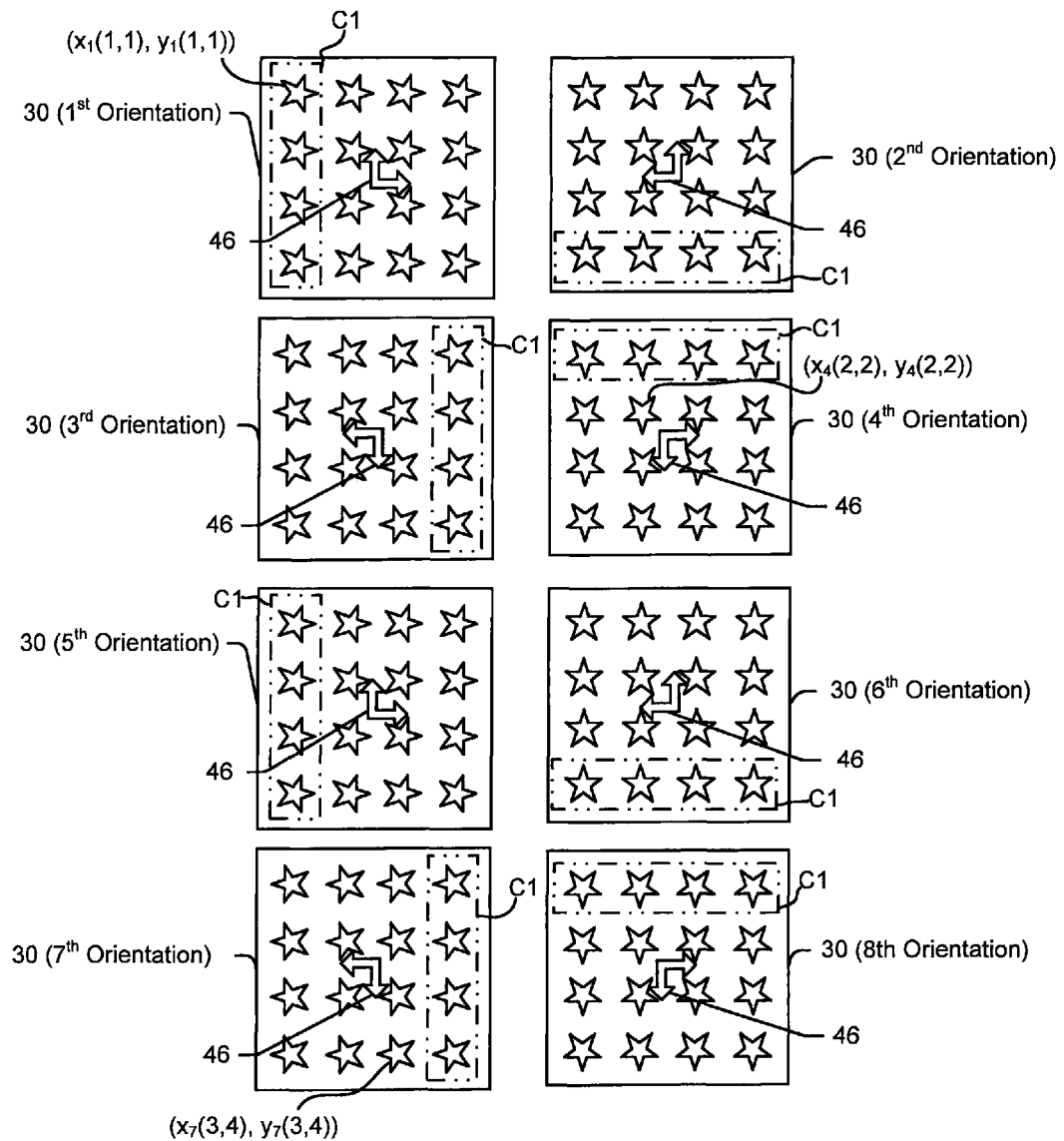
FIG. 3 is a schematic illustrating top plan views of the calibration plate shown in FIG. 2, albeit where the plate is shown in four different orientations, twice in each of the different orientations.

The fifth through eighth orientations shown in FIG. 3 are, ideally, identical to the first through fourth orientations, respectively, and are generated primarily for use during the image feature repeatability experiment as will be described hereafter. Here, between the image data generating processes associated with similarly oriented plates (i.e., the first and fifth orientations, the second and sixth orientations, etc.), plate 30 is unsecured, removed, replaced and resecured to the platform 24.

After the images are obtained, processor 16 processes the images to identify X and Y coordinates of each of the stars (i.e., of the central point of each star) in each of the images.

Figure 4:
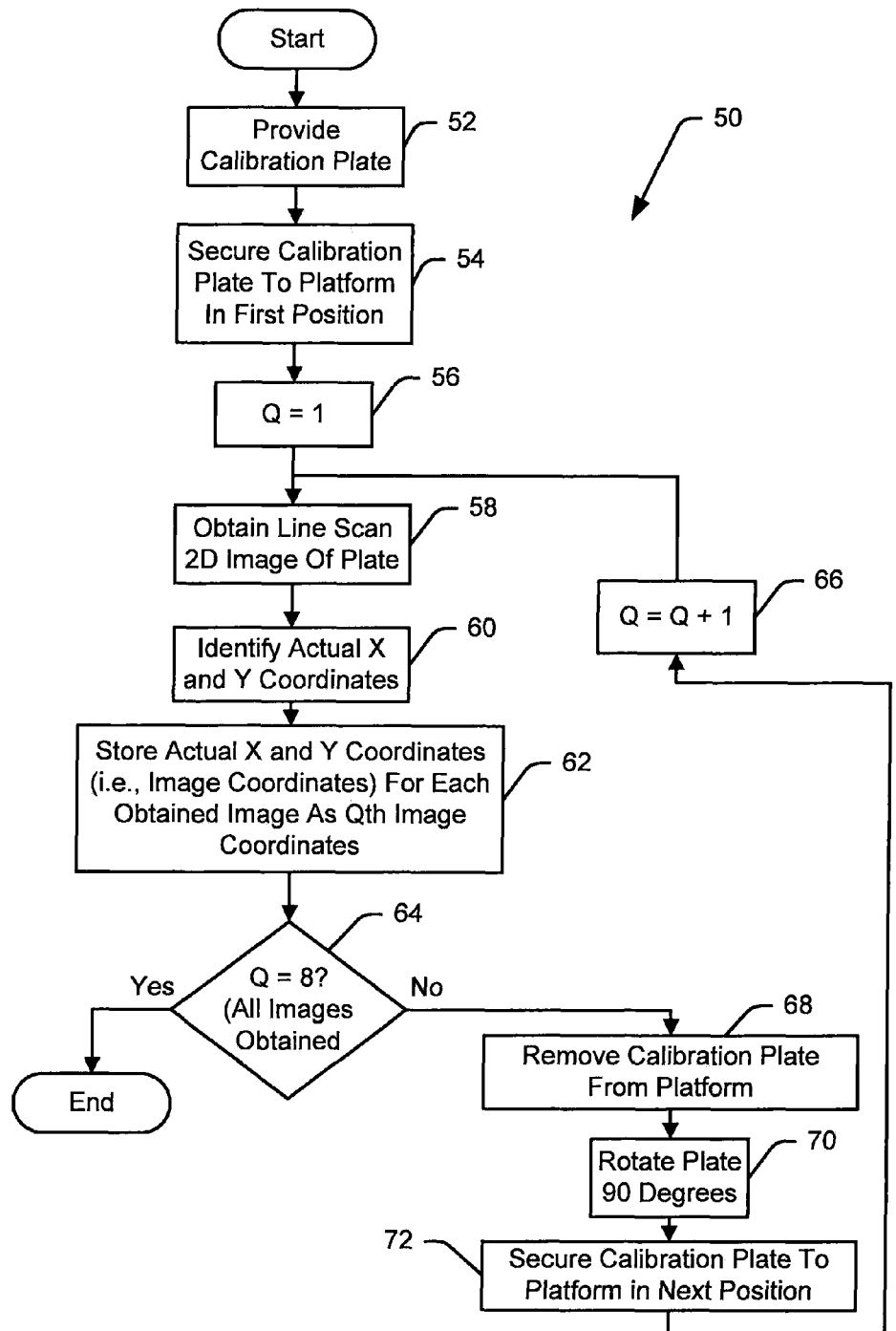
FIG. 4 is a flow chart illustrating a process for obtaining 2D images using the system of FIG. 1.

Referring now to FIG. 4, an exemplary process 50 for obtaining images of a calibration plate and for identifying star positions within the images is illustrated. At block 52, a calibration plate 30 (see FIG. 2) is provided and at block 54 the plate is secured to the platform 24 in a first position. At block 56 a counter value Q is set equal to 1. At block 58, a line scan image of the calibration plate 30 is obtained as the motion stage 12 is controlled to, ideally, move the plate 30 via linear and straight motion, through the camera FOV 15. Here, as plate 30 is moved, encoder 27 (see FIGS. 1 and 2) indicates shaft rotation to processor 16 via signals. The processor 16 counts the number of rotations of shaft 23 and, at a predetermined number of rotations (e.g., typically a fraction of one rotation), provides a signal to camera 14 causing camera 14 to obtain another image of its FOV. The line scan images generated in rapid succession together form a 2D image of plate 30.

At block 40, after a 2D image of the plate 30 is obtained and stored in memory 18, processor 16 re-accesses the image and identifies the actual X and Y coordinates of each star in the image and stores the X and Y coordinates in memory 18 at blocks 60 and 62. Next, at decision block 64, processor 16 uses counter Q to determine if all eight required images of the plate 30 have been obtained. The first time through the process Q is 1 and therefore control passes from block 64 to block 68 where processor 16, in at least some embodiments, provides instructions via interface 20 to a system user to remove, rotate and re-secure plate 30 to platform. The plate 30 is removed from platform 24. At block 70 the plate is rotated 90 degrees and at block 72 the plate is re-secured to the platform 24 in the next position after which counter Q is incremented by one at block 66 and control passes back up to block 58 where another image of plate 30 is obtained. Eventually, once all eight required images have been obtained, the process ends after block 64.

First Experiment—Stage Motion Linearity

When stage motion along the y-axis is perfectly linear, where the plate star pattern is precisely equi-spaced, even in the face of perspective and/or lens distortion, the Y position of each of the stars in an image should be a linear function of the star's indices (i.e., row and column). In other words, if the stage motion is perfectly linear, then the following equation would always be true for each star in an image:

$$y_n(u,v) = A_n u + B_n v + C_n \qquad \text{Eq. 1}$$

where n represents the image identifier (e.g., one of 1 through 8 in the present example) for some $A_n$, $B_n$ and $C_n$. Thus, where the y-positions of stars are not linear functions of their indices u and v, stage motion is not linear.

To determine whether or not stage motion is linear and the degree of non-linearity, for each of the images, a separate star-specific equation like equation 1 can be formed for each star in the image for a total of sixteen star-specific equations for each image. For example, in the case of the first image, the star-specific equations would include:

$$y_1(1,1) = A_1 1 + B_1 1 + C_1 \text{ for star } (1,1)$$

$$y_1(1,2) = A_1 1 + B_1 2 + C_1 \text{ for star } (1,2)$$

$$y_1(1,3) = A_1 1 + B_1 3 + C_1 \text{ for star } (1,3)$$

...

$$y_1(4,4) = A_1 4 + B_1 4 + C_1 \text{ for star } (4,4)$$

The set of star-specific equations corresponding to each image are solved for calculated $A_n$, $B_n$ and $C_n$ values for the image using a least square fitting process as known in the art. Thereafter, equation 1 can be rearranged for each of the stars in an image to generate first test residual equations as follows:

$$\text{Res}1_n = y_n(u,v) - (A_n u + B_n v + C_n) \qquad \text{Eq. 2}$$

For instance, in the case of the first image, the sixteen first test residual equations would include:

$$\text{Res}_{11}(1,1) = y_1(1,1) - (A_1 1 + B_1 1 + C_1) \text{ for star } (1,1)$$

$$\text{Res}_{11}(1,2) = y_1(1,2) - (A_1 1 + B_1 2 + C_1) \text{ for star } (1,2)$$

$$\text{Res}_{11}(1,3) = y_1(1,3) - (A_1 1 + B_1 3 + C_1) \text{ for star } (1,3)$$

...

$$\text{Res}_{11}(4,4) = y_1(4,4) - (A_1 4 + B_1 4 + C_1) \text{ for star } (4,4)$$

The calculated values $A_n$, $B_n$ and $C_n$ and actual position values $y_n(u,v)$ can be replaced in each of the star-specific equations corresponding to an image to generate residual values Resn(u,v) for each of the star-specific equations. Thus, for each of the eight images, sixteen separate residual values are generated for a total of 128 residual values.

The residual values are used to assess motion linearity. For instance, in at least some cases the average of the residual values may be calculated and compared to a first threshold value and where the average exceeds the first threshold, non-linearity may be detected. Other processes for determining if the residuals indicate non-linear motion are contemplated and the systems herein should not be limited to the exemplary processes described herein.

Figure 5:
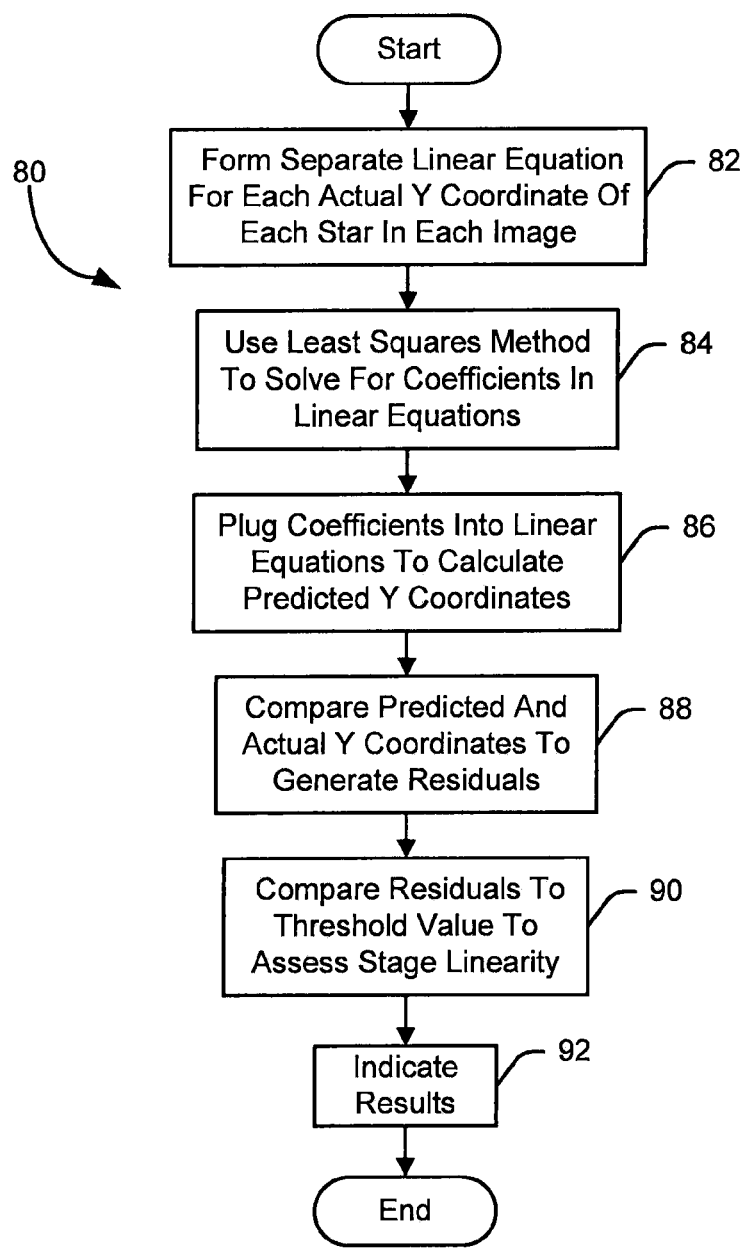
FIG. 5 is a flow chart illustrating a method consistent with a first experiment for assessing motion linearity described in this disclosure.

A method 80 for performing the first experiment to assess stage motion linearity is illustrated in FIG. 5. At block 82, separate star-specific linear equations like equation 1 above are generated for each of the stars in each of the eight obtained images. At block 84, a least squares process is used to solve for coefficients $A_n$, $B_n$ and $C_n$ for each of the eight obtained images. At blocks 86 and 88 the coefficients $A_n$, $B_n$ and $C_n$ are plugged into equations like equation 2 to generate predicted Y coordinates for each of the stars and to compare the predicted Y coordinates to the actual Y coordinates to yield residuals for each of the stars in each of the images. At block 90 the residuals are compared to the first threshold value and to assess motion linearity and at block 92 the results are indicated. Here, referring again to FIG. 1, the results may be indicated via interface 20 or the like.

Second Experiment—Stage Straightness

Even where stage motion linearity is low, it may be the case that the motion stage is non-straight so that the platform shifts horizontally in the X direction as it moves along a trajectory in the Y direction. It has been recognized that if the platform moves in a straight line motion, the stars' (or other image features) X coordinates should only linearly depend on the v index associated with the star (i.e., which row the star resides in). The image X coordinate may not necessarily be linear in u because of the effects of lens distortion, sensor size, perspective distortion, etc.

Assume that a star's X coordinate can be predicted using a 5th order function in X (in combination with a linear function in Y—here the function in Y is linear because it must be linear to handle rotation of the calibration plate). If stage motion is perfectly straight, then the following equation would always be true for each star in an image:

$$x_n(u,v) = a_{00}u^0v^0 + a_{01}u^0v^1 + a_{10}u^1v^0 + a_{11}u^1v^1 + a_{20}u^2v^0 + a_{21}u^2v^1 + a_{30}u^3v^0 + a_{31}u^3v^1 + a_{40}u^4v^0 + a_{41}u^4v^1 + a_{50}u^5v^0 + a_{51}u^5v^1$$  Eq. 3 where n represents the image identifier, for some set of coefficients $a_{00}$ through $a_{51}$. To determine whether or not stage motion is straight and the degree to which the motion is not straight, for each of the images, a separate star-specific equation like equation 3 can be formed for each star in the image for a total of sixteen star-specific equations for each image. For example, in the case of the first image, the star-specific equations would include:

$$x_1(1,1) = a_{00}1^01^0 + a_{01}1^01^1 + a_{10}1^11^0 + a_{11}1^11^1 + a_{20}1^21^0 + a_{21}1^21^1 \text{ for star } (1,1)$$

$$+ a_{30}1^31^0 + a_{31}1^31^1 + a_{40}1^41^1 + a_{41}1^41^1 + a_{50}1^51^0 + a_{51}1^51^1$$

$$x_1(1,2) = a_{00}1^02^0 + a_{01}1^02^1 + a_{10}1^12^0 + a_{11}1^12^1 + a_{20}1^21^0 + a_{21}1^22^1 \text{ for star } (1,2)$$

$$+ a_{30}1^32^0 + a_{31}1^32^1 + a_{40}1^42^1 + a_{41}1^42^1 + a_{50}1^52^0 + a_{51}1^52^1$$

...

$$x_1(4,4) = a_{00}4^04^0 + a_{01}4^04^1 + a_{10}4^14^0 + a_{11}4^14^1 + a_{20}4^24^0 + a_{21}4^24^1 \text{ for star } (4,4)$$

$$+ a_{30}4^34^0 + a_{31}4^34^1 + a_{40}4^44^1 + a_{41}4^44^1 + a_{50}4^54^0 + a_{51}4^54^1$$

The set of star-specific equations corresponding to each image are solved for calculated coefficients a00 through a51 for the image using a least squares fitting process as known in the art. Thereafter, equation 3 can be rearranged for each of the stars in an image to generate second test residual equations as follows:

$$Res_{2n}(u,v) = x_n(u,v) - (a_{00}u^0v^0 + a_{01}u^0v^1 + a_{10}u^1v^0 + a_{11}u^1v^1 + a_{20}u^2v^0 + a_{21}u^2v^1 + a_{30}u^3v^0 + a_{40}u^4v^0 + a_{41}u^4v^1 + a_{50}u^5v^0 + a_{51}u^5v^1)$$  Eq. 4

For instance, in the case of the first image, the sixteen residual equations would include:

$$Res_{21}(1,1) = x_1(1,1) - (a_{00}1^01^0 + a_{01}1^01^1 + a_{10}1^11^0 + a_{11}1^11^1 + a_{20}1^21^0 + a_{21}1^21^1 + a_{30}1^31^0 + a_{31}1^31^1 + a_{40}1^41^0 + a_{41}1^41^1 + a_{50}1^51^0 + a_{51}1^51^1) \text{ for star } (1,1)$$

$$Res_{21}(1,2) = x_1(1,2) - (a_{00}1^02^0 + a_{01}1^02^1 + a_{10}1^12^0 + a_{11}1^12^1 + a_{20}1^22^0 + a_{21}1^22^1 + a_{30}1^32^0 + a_{31}1^32^1 + a_{40}1^42^0 + a_{41}1^42^1 + a_{50}1^52^0 + a_{51}1^52^1) \text{ for star } (1,2)$$

...

$$Res_{21}(4,4) = x_1(4,4) - (a_{00}4^04^0 + a_{01}4^04^1 + a_{10}4^14^0 + a_{11}4^14^1 + a_{20}4^24^0 + a_{21}4^24^1 + a_{30}4^34^0 + a_{31}4^34^1 + a_{40}4^44^0 + a_{41}4^44^1 + a_{50}4^54^0 + a_{51}4^54^1) \text{ for star } (4,2)$$

The calculated coefficients $a_{00}$ through $a_{51}$ and actual values $x_n(u,v)$ can be replaced in the second test residual equations corresponding to an image and residual values $Res_n(u,v)$ for each of the star-specific equations can be generated. Thus, for each of the eight images, sixteen separate residual values are generated for a total of 128 residual values. The residual values can then be used to assess stage straightness. For instance, in at least some cases the average of the residual values may be calculated and compared to some second threshold value and where the average exceeds the second threshold, a crooked stage may be detected.

Figure 6:
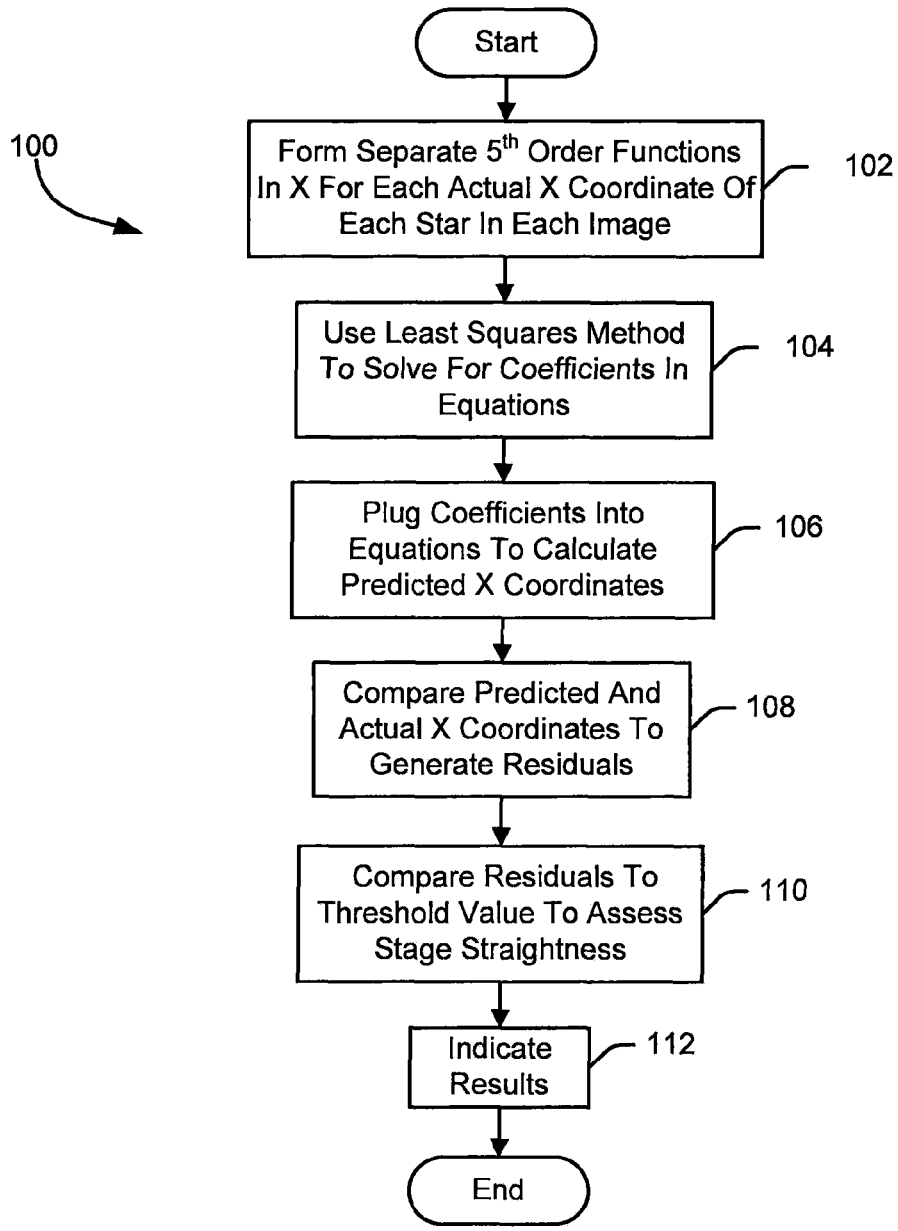
FIG. 6 is a flow chart illustrating a method consistent with a second experiment for assessing stage straightness described in this disclosure.

A method 100 for performing the second experiment is illustrated in FIG. 6. At block 102, separate star-specific $5^{th}$ order functions like equation 3 above are generated for each of the stars in each of the eight obtained images. At block 104, a least squares process is used to solve for coefficients $a_{00}$ through $a_{51}$ for each of the eight obtained images. At blocks 106 and 108 the coefficients $a_{00}$ through $a_{51}$ are plugged into equations like equation 4 to generate predicted X coordinates for each of the stars and to compare the predicted X coordinates to the actual X coordinates to yield residuals for each of the stars in each of the images. At block 110, the residuals are compared to the second threshold value to assess stage straightness and at block 112 the results are indicated. Referring again to FIG. 1, the results may be indicated via interface 20 or the like.

Third Experiment—Repeatability

In the third experiment the repeatability/accuracy of the image feature registration is measured. For this experiment, pairs of images are considered together wherein each pair includes two images where, ideally, the plate 30 is in the exact same position but where, in practice, there is typically some difference in position because the plate 30 is repositioned between imaging. For instance, referring again to FIG. 3, the images with the plate in the first and fifth orientations are considered together, the images of the plate in the second and sixth orientations are considered together, the images of the plate in the third and seventh orientations are considered together and the images of the plate in the fourth and eighth orientations are considered together.

In a perfect or ideal case where a pair of orientations (e.g., the first and fifth orientations) are identical and there is precise repeatability, the positions $(x_1(u,v), y_1(u,v))$ of the stars in the image corresponding to the first orientation should be identical to the positions $(x_5(u,v), y_5(u,v))$ of the stars in the image corresponding to the fifth orientation, the positions $(x_2(u,v), y_2(u,v))$ of the stars in the image corresponding to the second orientation should be identical to the positions $(x_6(u,v), y_6(u,v))$ of the stars in the image corresponding to the sixth orientation, and so on. However, because the plate is un-secured, removed and resecured between the pairs of approximately identical orientations, the orientations will not be exactly the same and therefore the positions of the stars will be at least slightly different in the images corresponding to the similarly oriented plates.

It is expected that there will be separate affine transformations corresponding to translation and rotation which maps between the two data sets in each pair. In other words, the following four equations should be solvable to identify transforming affines using the four pairs of images:

$$(x_1(u,v), y_1(u,v)) = \text{Affine}_{1,5} * (x_5(u,v), y_5(u,v))$$  Eq. 5

$$(x_2(u,v), y_2(u,v)) = \text{Affine}_{2,6} * (x_6(u,v), y_6(u,v))$$  Eq. 6

$$(x_3(u,v), y_3(u,v)) = \text{Affine}_{3,7} * (x_7(u,v), y_7(u,v))$$  Eq. 7

$$(x_4(u,v), y_4(u,v)) = \text{Affine}_{4,8} * (x_8(u,v), y_8(u,v))$$  Eq. 8

After solving for $\text{Affine}_{1,5}$, $\text{Affine}_{2,6}$, $\text{Affine}_{3,7}$ and $\text{Affine}_{4,8}$, the affines and the actual X and Y coordinates can be plugged into the following equations to generate third test residuals:

$$\text{Res}_{3\text{-}1,5}=(x_1(u,v),y_1(u,v))-\text{Affine}_{1,5}*(x_5(u,v),y_5(u,v)) \quad \text{Eq. 9}$$

$$\text{Res}_{3\text{-}2,6}=(x_2(u,v),y_2(u,v))-\text{Affine}_{2,6}*(x_6(u,v),y_6(u,v)) \quad \text{Eq. 10}$$

$$\text{Res}_{3\text{-}3,7}=(x_3(u,v),y_3(u,v))-\text{Affine}_{3,7}*(x_7(u,v),y_7(u,v)) \quad \text{Eq. 11}$$

$$\text{Res}_{3\text{-}4,8}=(x_4(u,v),y_4(u,v))-\text{Affine}_{4,8}*(x_8(u,v),y_8(u,v)) \quad \text{Eq. 12}$$

Where the third test residuals are small, the repeatability/accuracy is high and where the third test residuals are greater than a third threshold associated with repeatability, the repeatability/accuracy is unacceptable.

Figure 7:
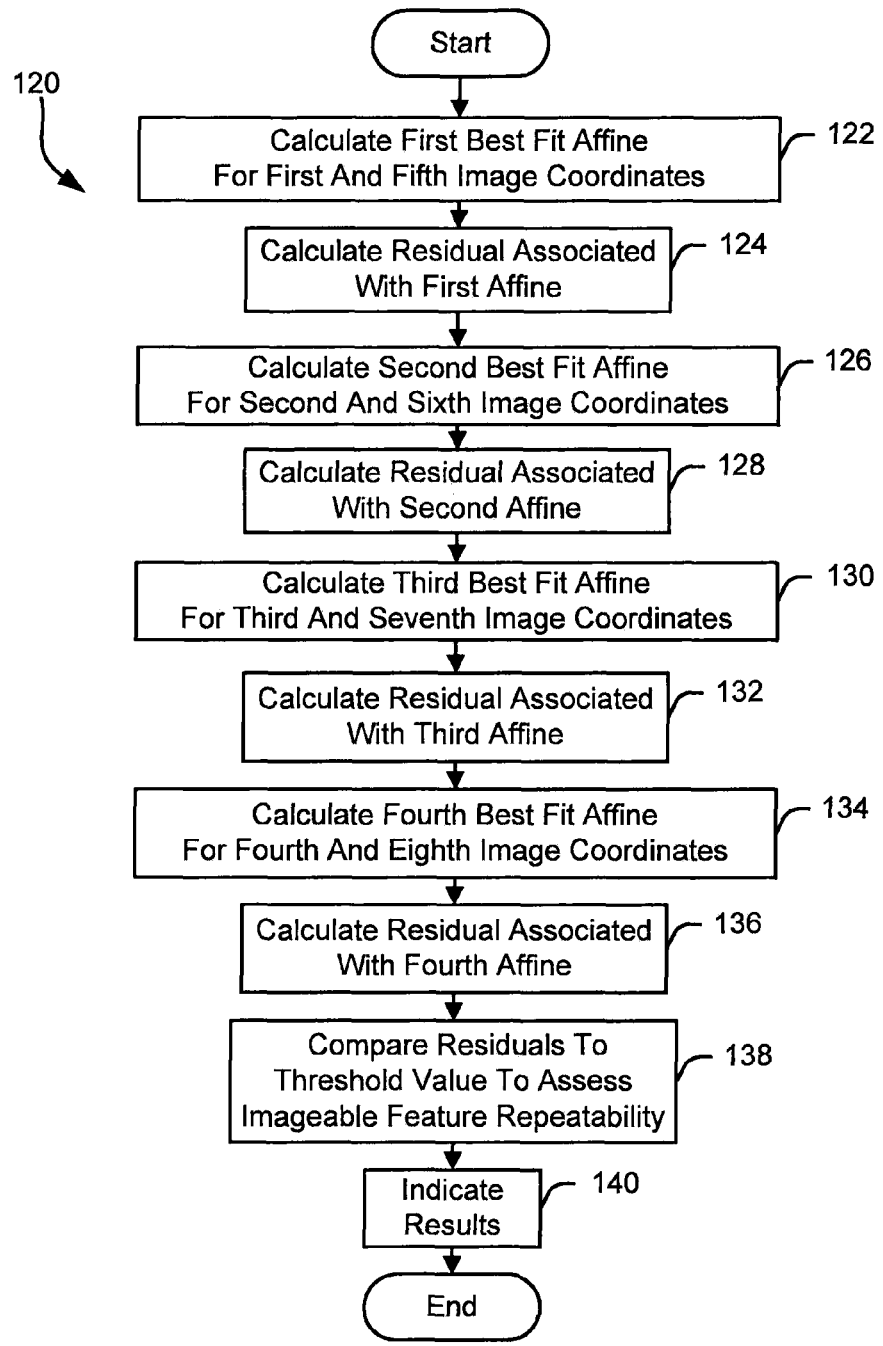
FIG. 7 is a flow chart illustrating a method consistent with a third experiment for assessing image capture repeatability described in this disclosure.

A method 120 for assessing repeatability that is consistent with the above comments is illustrated in FIG. 7. Referring also to FIG. 1, at block 122, processor 16 calculates a first best fit affine for the star positions in the first and fifth images and a third test residual is then calculated by solving equation 9 at block 124. At block 126, processor 16 calculates a best fit affine for the star positions in the second and sixth images and a third test residual is calculated by solving equation 10 at block 128. At block 130, processor 16 calculates a best fit affine for the star positions in the third and seventh images and a third test residual is calculated by solving equation 11 at block 132. At block 134, processor 16 calculates a best fit affine for the star positions in the fourth and eighth images and a third test residual is calculated by solving equation 12 at block 136. At block 138 the residuals are compared to the third threshold value to assess repeatability and results are indicated (e.g., via interface 20 in FIG. 1) at block 140.

Fourth Experiment—Plate Accuracy

Given the repeatability between images of the approximately aligned (i.e., similarly positioned) calibration plates, precision of the star pattern on the calibration plate can next be determined. In an ideal case, the calibration plate stars are perfectly positioned on the plate and rotation of the plate to the different orientations should have no effect on the results of an experiment like the third experiment described above. For this reason, it has been recognized that calibration plate inaccuracies can be quantified by running a test similar to the third test described above to compare star coordinates between images corresponding to non-aligned plate orientations (e.g., between images corresponding to the first and second orientations in FIG. 3, between images corresponding to the first and third orientations in FIG. 3, etc.). In other words, the following equations can be solved for the eighteen pairs of possible image combinations to generate nineteen separate affines:

$$(x_1(u,v),y_1(u,v))=\text{Affine}_{1,2}*(x_2(u,v),y_2(u,v)) \quad \text{Eq. 13}$$

$$(x_1(u,v),y_1(u,v))=\text{Affine}_{1,3}*(x_3(u,v),y_3(u,v)) \quad \text{Eq. 14}$$

$$(x_1(u,v),y1(u,v))=\text{Affine}_{1,4}*(x_4(u,v),y_4(u,v)) \quad \text{Eq. 15}$$

$$(x_1(u,v),y_1(u,v))=\text{Affine}_{1,6}*(x_6(u,v),y_6(u,v)) \quad \text{Eq. 16}$$

$$(x_1(u,v),y1(u,v))=\text{Affine}_{1,7}*(x_7(u,v),y_7(u,v)) \quad \text{Eq. 17}$$

$$(x_1(u,v),y_1(u,v))=\text{Affine}_{1,8}*(x_8(u,v),y_8(u,v)) \quad \text{Eq. 18}$$

$$(x_2(u,v),y_2(u,v))=\text{Affine}_{2,3}*(x_3(u,v),y3(u,v)) \quad \text{Eq. 19}$$

$$(x_2(u,v),y_2(u,v))=\text{Affine}_{2,4}*(x_4(u,v),y_4(u,v)) \quad \text{Eq. 20}$$

$$(x_2(u,v),y_2(u,v))=\text{Affine}_{2,5}*(x_5(u,v),y_5(u,v)) \quad \text{Eq. 21}$$

$$(x_2(u,v),y_2(u,v))=\text{Affine}_{2,7}*(x_7(u,v),y_7(u,v)) \quad \text{Eq. 22}$$

$$(x_2(u,v),y_2(u,v))=\text{Affine}_{2,8}*(x_8(u,v),y_8(u,v)) \quad \text{Eq. 23}$$

$$(x_3(u,v),y_3(u,v))=\text{Affine}_{3,4}*(x_4(u,v),y_4(u,v)) \quad \text{Eq. 24}$$

$$(x_3(u,v),y_3(u,v))=\text{Affine}_{3,5}*(x_5(u,v),y_5(u,v)) \quad \text{Eq. 25}$$

$$(x_3(u,v),y_3(u,v))=\text{Affine}_{3,6}*(x_6(u,v),y_6(u,v)) \quad \text{Eq. 26}$$

$$(x_3(u,v),y_3(u,v))=\text{Affine}_{3,8}*(x_8(u,v),y_8(u,v)) \quad \text{Eq. 27}$$

$$(x_4(u,v),y_4(u,v))=\text{Affine}_{4,5}*(x_5(u,v),y_5(u,v)) \quad \text{Eq. 28}$$

$$(x_4(u,v),y_4(u,v))=\text{Affine}_{4,6}*(x_6(u,v),y_6(u,v)) \quad \text{Eq. 29}$$

$$(x_4(u,v),y_4(u,v))=\text{Affine}_{4,7}*(x_7(u,v),y_7(u,v)) \quad \text{Eq. 30}$$

Note that Equations 13-30 do not include functions for $\text{Affine}_{1,5}$, $\text{Affine}_{2,6}$ or $\text{Affine}_{4,8}$ as those functions are covered by the third experiment. In some embodiments it is contemplated that these additional four affines would be used in this fourth experiment.

Given the Equations 13-30 can be written as fourth test residual equations 31-48 below and the affines and the actual X and Y coordinates can be plugged into equations 31-48 to generate eighteen separate fourth test residuals. Where the fourth test residuals are small, plate accuracy is high and where the fourth test residuals are greater than a fourth threshold, the plate accuracy is unacceptable.

$$\text{Res}_{4\text{-}1,2}=(x_1(u,v),y_1(u,v))-\text{Affine}_{1,2}*(x_2(u,v),y_2(u,v)) \quad \text{Eq. 31}$$

$$\text{Res}_{4\text{-}1,3}=(x_1(u,v),y_1(u,v))-\text{Affine}_{1,3}*(x_3(u,v),y_3(u,v)) \quad \text{Eq. 32}$$

$$\text{Res}_{4\text{-}1,4}=(x_1(u,v),y_1(u,v))-\text{Affine}_{1,4}*(x_4(u,v),y_4(u,v)) \quad \text{Eq. 33}$$

$$\text{Res}_{4\text{-}1,6}=(x_1(u,v),y_1(u,v))-\text{Affine}_{1,6}*(x_6(u,v),y_6(u,v)) \quad \text{Eq. 34}$$

$$\text{Res}_{4\text{-}1,7}=(x_1(u,v),y_1(u,v))-\text{Affine}_{1,7}*(x_7(u,v),y_7(u,v)) \quad \text{Eq. 35}$$

$$\text{Res}_{4\text{-}1,8}=(x_1(u,v),y_1(u,v))-\text{Affine}_{1,8}*(x_8(u,v),y_8(u,v)) \quad \text{Eq. 36}$$

$$\text{Res}_{4\text{-}2,3}=(x_2(u,v),y_2(u,v))-\text{Affine}_{2,3}*(x_3(u,v),y_3(u,v)) \quad \text{Eq. 37}$$

$$\text{Res}_{4\text{-}2,4}=(x_2(u,v),y_2(u,v))-\text{Affine}_{2,4}*(x_4(u,v),y_4(u,v)) \quad \text{Eq. 38}$$

$$\text{Res}_{4\text{-}2,5}=(x_2(u,v),y_2(u,v))-\text{Affine}_{2,5}*(x_5(u,v),y_5(u,v)) \quad \text{Eq. 39}$$

$$\text{Res}_{4\text{-}2,7}=(x_2(u,v),y_2(u,v))-\text{Affine}_{2,7}*(x_7(u,v),y_7(u,v)) \quad \text{Eq. 40}$$

$$\text{Res}_{4\text{-}2,8}=(x_2(u,v),y_2(u,v))-\text{Affine}_{2,8}*(x_8(u,v),y_8(u,v)) \quad \text{Eq. 41}$$

$$\text{Res}_{4\text{-}3,4}=(x_3(u,v),y_3(u,v))-\text{Affine}_{3,4}*(x_4(u,v),y_4(u,v)) \quad \text{Eq. 42}$$

$$\text{Res}_{4\text{-}3,5}=(x_3(u,v),y_3(u,v))-\text{Affine}_{3,5}*(x_5(u,v),y_5(u,v)) \quad \text{Eq. 43}$$

$$\text{Res}_{4\text{-}3,6}=(x_3(u,v),y_3(u,v))-\text{Affine}_{3,6}*(x_6(u,v),y_6(u,v)) \quad \text{Eq. 44}$$

$$\text{Res}_{4\text{-}3,8}=(x_3(u,v),y_3(u,v))-\text{Affine}_{3,8}*(x5(u,v),y_8(u,v)) \quad \text{Eq. 45}$$

$$\text{Res}_{4\text{-}4,5}=(x_4(u,v),y_4(u,v))-\text{Affine}_{4,5}*(x_5(u,v),y_5(u,v)) \quad \text{Eq. 46}$$

$$\text{Res}_{4\text{-}4,6}=(x_4(u,v),y_4(u,v))-\text{Affine}_{4,6}*(x_6(u,v),y_6(u,v)) \quad \text{Eq. 47}$$

$$\text{Res}_{4\text{-}4,7}=(x_4(u,v),y_4(u,v))-\text{Affine}_{4,7}*(x_7(u,v),y_7(u,v)) \quad \text{Eq. 48}$$

Figure 8:
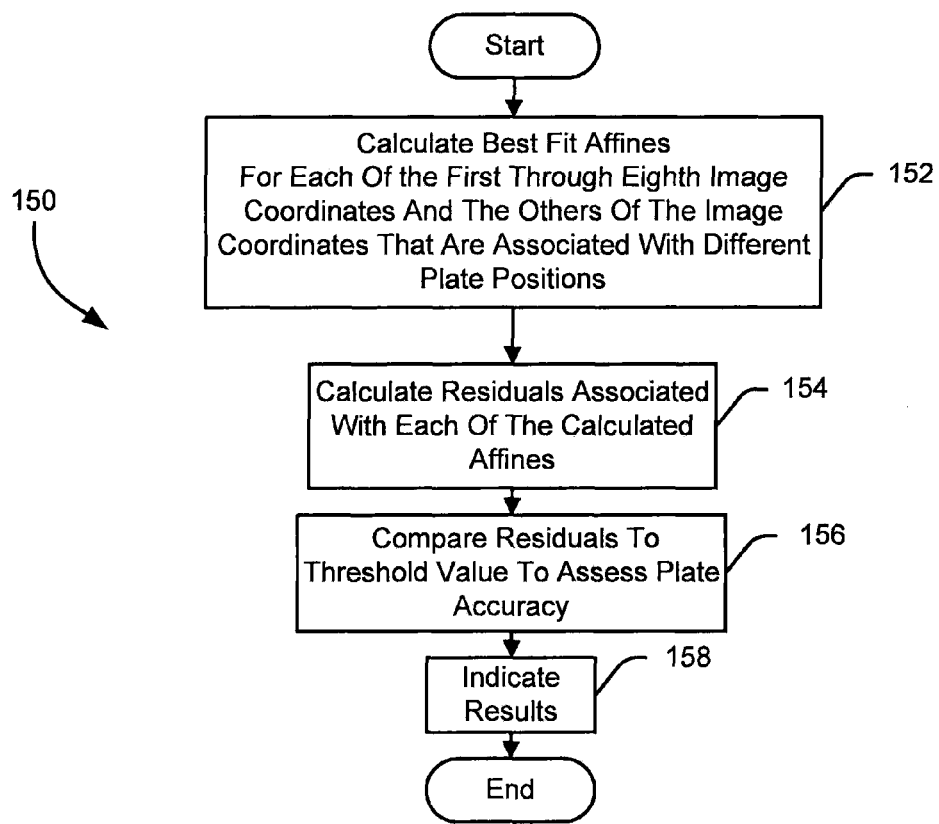
FIG. 8 is a flow chart illustrating a method consistent with a fourth experiment for assessing calibration plate accuracy described in this disclosure.

A method 150 for assessing plate accuracy that is consistent with the above comments is illustrated in FIG. 8. Referring also to FIG. 1, at block 152, processor 16 calculates best fit affines by solving equations 13 through 30. At block 154 residuals corresponding to each of the affines calculated at step 152 are calculated and at block 156 the residuals are compared to a threshold value to assess plate accuracy. Results are indicated (e.g., via interface 20 in FIG. 1) at block 158.

In at least some embodiments, if the inaccuracies associated with the residuals are less than one-sixth a desired overall system inaccuracy the stage set-up will be acceptable for most applications. In other applications more or less accuracy may be required.

While the invention may be susceptible to various modifications and alternative forms, specific embodiments have been shown by way of example in the drawings and have been described in detail herein. However, it should be understood that the invention is not intended to be limited to the particular forms disclosed. For example, while the embodiment described above includes four experiments, in at least some cases, any one of the experiments alone is useful in its own right. For instance, the first experiment may be used alone to assess the stage motion linearity or the second experiment may be used above to assess stage straightness. As another example, where the results of the first and second experiments indicate stage motion that is linear to within the range specified by the first threshold value and that the stage is straight to within the range specified by the second threshold value, the processor 16 may be programmed to halt the experiments because it is extremely likely that if the first and second experiments yield acceptable results, repeatability and calibration plate accuracy will be high.

As yet another example, while the exemplary plate includes sixteen stars, at least some of the experiments can be performed with fewer imageable features. For instance, the first experiment where the linear equation only includes three unknown coefficients can be solved with at least four stars so that residuals can be generated. Here, in general, where M is the number of unknowns, at least N equations should be solved where N is greater than M. It should be appreciated that, in general, the more imageable features used to assess an operating characteristic, the more robust and trustworthy the results.

As another example, in at least some cases, less than eight images may be used to assess an operating characteristic of a stage. For instance, in the case of the first experiment, in at least some embodiments only a single image of a plate may be used to assess motion linearity. In the case of the third experiment, in some embodiments only two images (i.e., one image per pair) may be used to assess repeatability. In still other cases, where less than eight images are initially used to assess an operating characteristic and the characteristic is determined to be unsatisfactory, additional images may be used to reassess the characteristic and see if the additional analysis changes the result. For instance, where the first experiment is performed on a first image and the motion is not deemed to be linear, additional images (e.g., the second through eighth) may be processed in an attempt to generate different results. Even where eight or some other set of images are obtained, different subsets of the images may be used to perform different ones of the experiments. For instance, in some cases, only the first two images may be used to perform the first two experiments and some other image subset may be used to perform the third and fourth experiments.

While the calibration plate above is described as including stars, it should be appreciated that other calibration plates are contemplated that have other imageable features such as squares, checkerboard patterns, diamonds, etc. To this end, the calibration plate may include any physical object that includes imageable features, usually of known size and position. Here, the term "imageable" means both visible/distinguishable in an image and/or registerable/recognizable by a machine vision algorithm. For instance, in some cases a corner of a checkerboard may be registerable or some other feature of an imageable feature may be registerable.

While the example above employs a calibration plate having sixteen stars and is described as using all of the stars in at least some of the experiments, it should be appreciated that in some cases only a subset of the total set of imageable features may be visible/registerable within an image. In at least some embodiments it is contemplated that the experiments may be adaptive such that the experiments are performed using whatever feature subset is visible/registerable.

In some embodiments, as illustrated in the FIG. 3 series of figures, each plate 30 will include at least some fiducial mark 46 that is used by the system to distinguish imageable features from each other. For instance, knowing the relative juxtaposition of fiducial 46 to each star on the exemplary plate 30, the system can distinguish star (1,1) from the other stars and so on. One exemplary plate that can be used to perform the experiments described above includes the Cognex Checkerboard calibration plate CALPL-10MM-00.

Moreover, while one type of linear stage is described above, the invention can be used with any "linear stage" including any actuator such as a 3D motion stage where only one axis is moved or a robot programmed to move along a single trajectory.

Furthermore, the line scan camera does not have to be perpendicular to the direction of stage motion travel. Non-perpendicularity can be accommodated by first determining stage motion travel direction with respect to the camera field of view and then taking that information into account when generating the 2D line scan images.

In addition, the term "perpendicular" should be defined as relatively perpendicular (e.g., within ten degrees of perpendicular) because it is physically impossible to achieve "perfect" perpendicularness.

Moreover, while mechanical clamping wingnuts are shown in FIG. 2 for securing plate 30 to platform 24, other securing features are contemplated such as, for instance, a vacuum chuck to such down and secure the plate. Furthermore, an area scan camera could be used as a line scan camera (e.g., a user may choose to only use a particular row or column of the 2D sensors). In other words, each element of the line scan camera could be synthesized by analyzing one or more 2D sensing elements from an area-scan camera—such that a line scan camera could be emulated using an area scan camera.

In addition, in at least some embodiments it is contemplated that a line scan image can be generated by moving the camera and leaving the object stationary or moving both the camera and the object. In either of these cases the process of analyzing the linear motion described above is still applicable.

Furthermore, in general, at least some methods that are consistent with at least embodiments of the present disclosure include using the experimental results to adjust/modify the system when inaccuracies/imprecision greater than threshold levels is identified. For instance, where results from the first experiment indicate a substantially non-linear system, the system may be adjusted to increase linearity and the experiments may be rerun to retest for linearity. Similarly, where experiments indicate acceptable stage motion linearity and straightness but an inaccurate calibration plate, a different plate may be employed to generate other experimental results. In this regard, at least some disclosed methods include the steps of attempting to build a very high accuracy/high precision vision system using a line scan camera, line scan camera optics, a motion stage, and a calibration procedure, using one or more of the experiments described above to assess accuracy/precision of the system and to generate information indicating which of the calibration plate, the stage straightness and stage non-linearity is inaccurate/imprecise based on the experimental results, when the system accuracy/precision is good enough, halting the configuration process and, using the inaccuracy/imprecision information to modify the system and repeating the testing steps to increase system accuracy/precision when possible.

Thus, the invention is to cover all modifications, equivalents, and alternatives falling within the spirit and scope of the invention as defined by the following appended claims.

To apprise the public of the scope of this invention, the following claims are made:

The invention claimed is:

1. A method for assessing motion linearity of a motion stage for a machine-vision system, the method for use with a line scan camera having a field of view (FOV), where the motion stage includes a moveable platform positioned with respect to the camera so that the platform travels through the camera FOV along a motion stage trajectory, the method comprising the steps of:
providing a calibration plate that includes at least four imageable features, the calibration plate being supported on the moveable platform;
using the line scan camera to obtain data for generating a first two dimensional image of the calibration plate as the motion stage moves the calibration plate through the camera field of view along the motion stage trajectory; and
running a processor programmed to perform the steps of:
examining the first obtained image to identify an actual Y coordinate for each of the at least four imageable features in the first image; and
processing linear equations including the actual Y coordinates of each of the at least four imageable features to assess stage motion linearity, stage motion linearity indicating, at least in part, a degree of constancy of stage motion.

2. The method of claim 1 wherein the calibration plate includes at least four imageable features arranged in four separate rows equi-spaced along the Y-axis of the plate.

3. The method of claim 2 wherein an X-axis of the plate is perpendicular to the Y-axis of the plate and wherein the four imageable features are arranged in a single column and have the same X-axis coordinate.

4. The method of claim 1 wherein the step of processing the actual Y coordinates includes using the actual Y coordinates for the features to solve N linear equations for M unknown coefficients where M is less than N, using the M coefficients to solve at least one of the N linear equations to identify a predicted Y coordinate for one of the imageable features, comparing the predicted Y coordinate for the one of the imageable features and the actual Y coordinate of the one of the features to generate at least one residual value, and using the at least one residual value to assess motion linearity.

5. The method of claim 4 wherein the step of using the actual Y coordinates to solve N equations for M coefficients includes performing a least squares process on the N equations to generate the M coefficients.

6. The method of claim 4 wherein the step of using the M coefficients to solve at least one of the N equations includes using the M coefficients to solve at least a subset of more than two of the linear equations to identify a separate predicted Y coordinate for each of a subset of the imageable features, the step of comparing including comparing the predicted and actual Y coordinates of the subset of the imageable features to generate a plurality of residual values and the step of using the at least one residual value including the step of using a subset of the plurality of residual values to assess motion linearity.

7. The method of claim 6 wherein the calibration plate includes four equi-spaced rows and four equi-spaced columns of imageable features.

8. The method of claim 1 also for assessing stage motion straightness, wherein the step of providing a calibration plate includes providing a plate that includes a plurality of imageable features arranged in at least two equi-spaced rows and two equi-spaced columns, the processor further programmed to perform the steps of:
examining the first obtained image to identify actual X coordinates of the imageable features in the first image; and
processing the actual X coordinates to assess stage motion straightness.

9. The method of claim 8 wherein the calibration plate includes at least thirteen imageable features.

10. The method of claim 9 wherein the step of processing the actual X coordinates includes using the actual X coordinates for the imageable features to solve at least thirteen equations for twelve coefficients, using the twelve coefficients to solve at least one of the thirteen equations to calculate a predicted X coordinate for at least one of the imageable features, comparing the predicted X coordinate for the one of the imageable features and the actual X coordinate of the one of the imageable features to generate at least one residual value and using the at least one residual value to assess stage motion straightness.

11. The method of claim 10 wherein the calibration plate includes four equi-spaced rows and four equi-spaced columns of imageable features and wherein the step of processing the actual X coordinates includes using the actual X coordinates for the features to solve sixteen fifth order equations to calculate twelve coefficients, using the twelve coefficients to solve at least one of the sixteen fifth order equations to calculate a predicted X coordinate for at least one of the imageable features, comparing the predicted X coordinate for the at least one of the fifth order equations and the actual X coordinate for the one of the imageable features to generate at least one residual value and using the at least one residual value to assess stage motion straightness.

12. The method of claim 8 also for assessing image capture repeatability wherein the actual X and Y coordinates of the imageable features in the first image are first image coordinates, the method further comprising the steps of:
where the first image was generated with the calibration plate in a first position with respect to the platform, removing the calibration plate from the platform;
attempting to replace the calibration plate on the platform in the first position;
using the line scan camera to obtain data for generating a second two dimensional image of the calibration plate as the motion stage moves the calibration plate through the camera field of view along the motion stage trajectory;
the processor further programmed to perform the steps of:
examining the second obtained image to identify second image coordinates including actual X and Y coordinates of the imageable features in the second image; and processing the first and second image coordinates to assess image capture repeatability.

13. The method of claim 12 wherein the step of processing the first and second image coordinates includes identifying a best fit affine transformation that best relates the first image coordinates and the second image coordinates and identifying a residual associated with the best fit affine transformation.

14. The method of claim 12 further including the steps of, removing the plate from the platform and replacing the plate on the platform in a second position, using the line scan camera to obtain data for generating a third two dimensional image of the calibration plate as the motion stage moves the calibration plate through the camera field of view along the motion stage trajectory, running the processor to perform the steps of examining the obtained third image to identify third image coordinates including actual X and Y coordinates of the imageable features in the third image, removing the plate from the platform and attempting to replace the plate on the platform in the second position, using the line scan camera to obtain data for generating a fourth two dimensional image of the calibration plate as the motion stage moves the calibration plate through the camera field of view along the motion stage trajectory and running the processor to perform the steps of examining the obtained fourth image to identify fourth image coordinates including actual X and Y coordinates of the imageable features in the fourth image, the step of processing coordinates to assess image feature repeatability including processing the first, second, third and fourth image coordinates to assess image feature repeatability.

15. The method of claim 12 also for assessing calibration plate accuracy wherein the calibration plate has been designed so that the positions of at least a subset of the imageable features on the plate should form the same pattern in obtained images irrespective of whether or not the calibration plate is in the first or a second position on the platform, the method further comprising the steps of, removing the calibration plate from the platform and replacing the calibration plate on the platform in the second position, using the line scan camera to obtain data for generating a third two dimensional image of the calibration plate as the motion stage moves the calibration plate through the camera field of view along the motion stage trajectory, the processor further programmed to perform the steps of examining the third image to identify third image coordinates including actual X and Y coordinates of the imageable features in the third image and processing the first and third image coordinates to assess calibration plate accuracy.

16. The method of claim 15 wherein the step of processing the first and third image coordinates includes identifying a best fit affine transformation that best relates the first image coordinates and the third image coordinates and identifying a residual associated with the best fit affine transformation.

17. A method for assessing stage motion straightness of a motion stage for a machine vision system, the method for use with a line scan camera having a field of view (FOV), where the motion stage includes a moveable platform positioned with respect to the camera so that the platform travels through the camera FOV along a motion stage trajectory, the method comprising the steps of:
 providing a calibration plate that includes a plurality of imageable features arranged in at least two equi-spaced rows and two equi-spaced columns where the columns are aligned along a Y-axis of the plate, the calibration plate being supported on the moveable platform;
 supporting the calibration plate on the platform so that the Y-axis of the plate is aligned parallel to the motion stage trajectory;
 using the line scan camera to obtain data for generating a first two dimensional image of the calibration plate as the motion stage moves the calibration plate through the camera field of view along the motion stage trajectory; and
 running a processor programmed to perform the steps of:
 examining the obtained image to identify an actual X coordinate, for each of the plurality of imageable features in the image; and
 processing linear equations including the actual X coordinates of each of the plurality of imageable features to assess stage motion straightness.

18. A method for assessing image capture repeatability of a motion stage and camera system for a machine vision system, the method for use with a line scan camera having a field of view (FOV), where the motion stage includes a moveable platform positioned with respect to the camera so that the platform travels through the camera FOV along a motion stage trajectory, the method comprising the steps of:
 providing a calibration plate that includes at least first and second imageable features, the calibration plate being supported on the moveable platform;
 using the line scan camera to obtain data for generating a first two dimensional image of the calibration plate as the motion stage moves the calibration plate through the camera field of view along the motion stage trajectory with the calibration plate in a first position on the platform;
 removing the calibration plate from the platform after obtaining data for generating the first two dimensional image;
 attempting to replace the calibration plate on the platform in the first position;
 using the line scan camera, after attempting to replace the calibration plate, to obtain data for generating a second two dimensional image of the calibration plate as the motion stage moves the calibration plate through the camera field of view along the motion stage trajectory; and
 running a processor programmed to perform the steps of:
 examining the first image to identify first image coordinates including first actual X and Y coordinates of the imageable features in the first image;
 examining the second image to identify second image coordinates including second actual X and Y coordinates of the imageable features in the second image; and
 processing the first and second image coordinates to assess image capture repeatability.

19. The method of claim 18 wherein the step of processing the first and second image coordinates includes identifying a best fit affine transformation that best relates the first image coordinates and the second image coordinates and identifying a residual associated with the best fit affine transformation.

20. A method for assessing calibration plate accuracy of a calibration plate for use in calibrating a motion stage for a machine vision system, the method for use with a line scan camera having a field of view (FOV), where the motion stage includes a moveable platform positioned with respect to the camera so that the platform travels through the camera FOV along a motion stage trajectory, the method comprising the steps of:
 providing a calibration plate that includes at least first and second imageable features wherein the plate includes a Y-axis and has been designed so that the positions of at least a subset of the imageable features on the plate should form the same pattern in obtained images irrespective of whether or not the calibration plate is in the first or a second position on the platform;
 supporting the calibration plate on the platform in the first position;
 using the line scan camera to obtain data for generating a first two dimensional image of the calibration plate as the motion stage moves the calibration plate through the camera field of view along the motion stage trajectory;
 removing the calibration plate from the platform;
 supporting the calibration plate on the platform in the second position that is different from the first position;
 using the line scan camera to obtain data for generating a second two dimensional image of the calibration plate as the motion stage moves the calibration plate through the camera field of view along the motion stage trajectory; and running a processor programmed to perform the steps of:

examining the first image to identify first image coordinates including first actual X and Y coordinates of the imageable features in the first image;

examining the second image to identify second image coordinates including second actual X and Y coordinates of the imageable features in the second image; and processing the first and second image coordinates to assess calibration plate accuracy.

21. The method of claim 20 wherein the step of processing the first and second image coordinates includes identifying a best fit affine transformation that best relates the first image coordinates and the second image coordinates and identifying a residual associated with the best fit affine transformation.

22. A method for assessing at least two of motion linearity of a motion stage, stage motion straightness of a motion stage, image capture repeatability, and calibration plate accuracy for a machine vision system, the method for use with a line scan camera having a field of view (FOV), where the motion stage includes a moveable platform positioned with respect to the camera so that the platform travels through the camera FOV along a motion stage trajectory, the method comprising the steps of:

providing a calibration plate that includes a plurality of imageable features arranged in equi-spaced rows and equi-spaced columns where the columns;

supporting the calibration plate on the platform in first through fourth positions wherein the Y-axis of the plate is substantially parallel to the motion stage trajectory when in the first position and is substantially parallel to the motion stage trajectory and rotated 180 degrees from the first position when in the third position and the X-axis of the plate is parallel to the motion stage trajectory when in the second position and is parallel to the motion stage trajectory and rotated 180 degrees from the second position when in the fourth position;

for each of the first through fourth positions, the method further including the step of using the line scan camera to obtain data for generating two two-dimensional images of the calibration plate as the motion stage moves the calibration plate through the camera field of view along the motion stage trajectory; and running a processor programmed to perform the steps of:

examining the obtained images to identify actual X and Y coordinates of each of the plurality of imageable features in the images; and processing linear equations including the actual X and Y coordinates of all each of the plurality of imageable features to assess at least two of stage motion linearity, stage motion straightness, image capture repeatability and calibration plate accuracy.

23. A method for assessing at least two of stage motion linearity, stage motion straightness, image feature registration repeatability, and calibration plate accuracy for a machine vision system, the method for use with a line scan camera having a field of view (FOV), where the motion stage includes a moveable platform positioned with respect to the camera so that the platform travels through the camera FOV along a motion stage trajectory, the method comprising the steps of:

providing a calibration plate that includes at least four imageable features, the calibration plate being in a first position;

using the line scan camera to obtain data for generating a first two dimensional image of the calibration plate as the motion stage moves the calibration plate through the camera field of view along the motion stage trajectory; and running a processor programmed to perform the steps of:

examining the obtained first image to identify actual image coordinates of the features in the first image; and processing linear equations including the actual image coordinates of all each of the plurality of imageable features to assess at least two of the following: stage motion linearity, stage motion straightness, image feature registration repeatability, and calibration plate accuracy.

24. A method for configuring a very high accuracy/high precision machine vision system including a line scan camera having a field of view (FOV), line scan camera optics and a motion stage, where the motion stage includes a moveable platform positioned with respect to the camera so that the platform travels through the camera FOV along a motion stage trajectory, the method-comprising the steps of:

attempting to build a very high accuracy/high precision vision system using the line scan camera, line scan camera optics and the motion stage, before attempting to obtain data for generating a first two dimensional image of a calibration plate, wherein the calibration plate includes at least four imageable features;

performing a calibration procedure including performing each of a stage motion linearity experiment, a stage motion straightness experiment, an image feature repeatability experiment and a calibration plate accuracy experiment to generate test results, wherein the calibration procedure includes processing linear equations including the actual coordinates of each of the at least four imageable features;

using the test results to assess system accuracy/precision; and where accuracy/precision of the system is below a threshold level, modifying the system to increase accuracy/precision and repeating the calibration procedure and the step of using the test results to assess system accuracy/precision.

25. The method of claim 24 wherein the step of performing a calibration procedure also generates information indicating the source of inaccuracy/imprecision.

26. The method of claim 25 wherein the information indicating the source of inaccuracy/imprecision indicates at least one of the calibration plate, stage straightness and stage non-linearity.

27. The method of claim 24 wherein the step of performing a calibration procedure includes performing each of the stage motion linearity experiment and the stage motion straightness experiment and only performing the image feature repeatability experiment and the calibration plate accuracy experiment when the stage motion linearity experiment and the stage motion straightness experiment inaccuracies are greater than threshold levels.

* * * * *